United States Patent [19]
Lyons et al.

[11] Patent Number: 5,826,216
[45] Date of Patent: Oct. 20, 1998

[54] ANTICIPATORY COLLISION SENSOR SYSTEM

[75] Inventors: Christopher T. Lyons, Tyngsboro; Ismail Taskin, Arlington, both of Mass.

[73] Assignee: Hittite Microwave Corp., Woburn, Mass.

[21] Appl. No.: 796,290

[22] Filed: Feb. 7, 1997

[51] Int. Cl.[6] .................................................. G01S 9/56
[52] U.S. Cl. ........................... 702/143; 342/43; 342/70; 342/71; 342/84
[58] Field of Search ............................. 364/561; 701/45, 701/46, 47; 342/72, 104, 107, 455, 43, 70, 84, 71, 109, 114; 340/436; 180/271, 282; 702/143

[56] References Cited

U.S. PATENT DOCUMENTS

| | | | |
|---|---|---|---|
| 3,832,709 | 8/1974 | Klein et al. | 342/127 |
| 3,860,923 | 1/1975 | Yamanka et al. | 342/72 |
| 3,864,678 | 2/1975 | Yamanka et al. | 342/59 |
| 3,893,114 | 7/1975 | Yamanaka et al. | 342/72 |
| 3,952,303 | 4/1976 | Watanable et al. | 342/112 |
| 3,974,501 | 8/1976 | Ritzie | 342/128 |
| 4,003,049 | 1/1977 | Sterzer et al. | 342/43 |
| 4,008,473 | 2/1977 | Hinachi et al. | 342/84 |
| 5,517,196 | 5/1996 | Pakett et al. | 342/70 |
| 5,638,281 | 6/1997 | Wang | 701/301 |
| 5,694,130 | 12/1997 | Suzuki et al. | 342/72 |

*Primary Examiner*—Louis M. Arana
*Assistant Examiner*—Hien Vo
*Attorney, Agent, or Firm*—Iandiorio & Teska

[57] ABSTRACT

An anticipatory object detection system includes a transducer device for transmitting a modulated carrier signal and receiving the reflected modulated carrier signal from an object; a detection device for detecting a plurality of Doppler shifted harmonic components from the reflected modulated carrier signal; a range determining device responsive to the amplitude of at least two of the harmonic components for determining the instantaneous range of the object; a velocity measurement device, responsive to the frequency of at least one of the harmonic components, for determining the relative, instantaneous velocity of the object.

29 Claims, 10 Drawing Sheets

ANTICIPATORY COLLISION SENSOR SYSTEM

FIELD OF INVENTION

This invention relates to an anticipatory collision sensor system, and more particularly to an anticipatory object detection system for a passenger restraint system which detects a Doppler shift in a received signal reflected from an object and determines the range and velocity of the object and determines if a collision with the object is imminent.

BACKGROUND OF INVENTION

Air bags are used widely in passenger cars, light trucks and vans as auxiliary protection devices to seat belts for increased driver and occupant protection in collision situations. The air bag was designed to enhance the protection offered by seat belt systems, especially in higher speed front impact crashes where minor belt induced injuries and serious head and chest injuries can still occur to occupants restrained only by seat belts.

In most collisions, the decision to deploy the air bag is not made until late in the crash event after contact with an object when a shift of occupant position is likely. This leaves the occupant vulnerable to serious injury or death by the inflation or unfurling of the air bag as it deploys. This raises particular concerns when the occupants are children or the elderly who tend to be more physically susceptible to injury. One method of mitigating injuries caused by deployment of the air bag is to use a pre-crash sensor to detect an imminent collision and help reduce the decision time of air bag deployment.

Primarily for reasons of economy, crash detection technology is currently provided by the use of a single point, fully electronic sensor located in the passenger compartment. The function of the crash sensor is to measure the crash severity as it occurs by measuring changes in velocity and if a lower threshold is exceeded, air bag inflation is initiated. The output of this sensor is processed in a variety of ways. It can be filtered to provide a measure of the basic crash pulse, analyzed to establish rate of acceleration change (jerk), integrated to indicate velocity change, or analyzed for frequency content or other parametrics. These measurements are then evaluated by a fuzzy logic system to provide reliable determination of the severity of the crash in progress, thus allowing for deployment initiation as early as possible. However, this processing takes time. In low speed crashes which produce velocity changes at or near the deployment threshold, the decision to deploy the air bag is not made until very late in the crash event, typically 25–50 milliseconds. These sensors may trigger false alarms which unnecessarily deploy the air bag. In such lower speed crashes an un-belted occupant will move closer to the air bag before inflation when compared to an occupant in a higher severity crash. The close proximity to the deploying air bag increases the chance of severe injury or death to the occupant as the pellets explode to inflate the air bag, not only because of the force of the inflating air bag, but from the heat generated from the explosion as well. Thus, current crash sensing technology provides less than ideal protection to the occupant in slower speed crashes.

A wide range of sensing devices have been investigated for a pre-crash sensor, including ultrasonic, infrared, and microwave radar. Of these, microwave radar has proven to be the strongest candidate for pre-crash detection for the simple reason that microwave radar is less affected by most environmental conditions that exist in driving situations, unlike ultrasonic and infrared sensors.

Use of microwave radar for primary air bag deployment has been investigated in the past. However, these systems required the use of Fast Fourier Transforms (FFT) to extract the harmonic components, which typically cost hundreds of dollars, and complex processors to run the systems due to the complex calculations performed. Other systems that have explored harmonic binning spent considerable time monitoring each harmonic amplitude to determine range. These systems also required complex processors to perform the calculations necessary to detect the range of an object. Further, given the number of calculations, these processors required considerable time to determine the range and necessarily lag behind the actual range of fast moving objects. Thus, the high cost of early systems as well as the inability of radar to determine target mass deemed the use of microwave radar unacceptable. These pre-crash sensors detected objects which were too distant to pose a threat, or objects which were not on a collision path with the automobile such as mailboxes, signs and sidewalks.

SUMMARY OF INVENTION

It is therefore an object of this invention to provide an improved anticipatory collision sensor system.

It is a further object of this invention to provide such an anticipatory collision sensor system which allows an air bag to deploy earlier in the crash event.

It is a further object of this invention to provide such an anticipatory collision sensor system which can determine that a collision is imminent before contact with an object.

It is a further object of this invention to provide such an anticipatory collision sensor system which can determine the severity of the collision based on the object's relative closing velocity prior to impact.

It is a further object of this invention to provide such an anticipatory collision sensor system which is not affected by atmospheric conditions.

It is a further object of this invention to provide such an anticipatory collision sensor system which is cost effective to manufacture and implement.

It is a further object of this invention to provide such an anticipatory collision sensor system which complies with FCC regulations.

It is a further object of this invention to provide such an anticipatory collision sensor system which has a broad field of view.

It is a further object of this invention to provide such an anticipatory collision sensor system which has a high degree of resolution.

It is a further object of this invention to provide such an anticipatory collision sensor system which can detect the range of an object within a predetermined distance that represents the range in which the object poses a threat.

It is a further object of this invention to provide such an anticipatory collision sensor system which ignores objects that are not on a collision course.

It is a further object of this invention to provide such a anticipatory sensor system which can determine the relative velocity of the colliding object.

It is a further object of this invention to provide such an anticipatory collision sensor system which reduces the risk of false alarms.

It is a further object of this invention to provide such an anticipatory collision sensor system which can determine when the collision will occur.

The invention results from the realization that a truly effective passenger restraint system can be achieved by using an anticipatory object detection system including an object detection device, which determines the range of an object by detecting the to intersection of the amplitudes of the harmonic components of the reflected signal from an object which implies the instantaneous range of the object thereafter tracking its range by counting the Doppler cycles of the reflected signal, and a velocity measurement device which determines the relative velocity of the object from the Doppler frequency of the reflected signal so that a decision device can determine whether and when a collision will occur, based on the range and velocity information, and the passenger restraint system can be signalled, prior to impact with the object, that impact with the object is imminent.

The invention features an anticipatory object detection system which includes a transducer device for transmitting a modulated carrier signal and receiving the reflected modulated carrier signal from an object. There is a detection device for detecting a plurality of Doppler shifted harmonic components from the reflected modulated carrier signal and a range determining device responsive to the amplitude of at least two of the harmonic components for determining the instantaneous range of the object. There is a velocity measurement device, responsive to the frequency of at least one of the harmonic components, for determining the relative, instantaneous velocity of the object.

In a preferred embodiment there may be a collision decision device, responsive to the range determining device and the velocity measurement device for indicating that a collision with the object is imminent before contact is made with the object. There may be a passenger restraint system for an automobile. The range determining device may include means for detecting when the amplitude of one of the harmonic components exceeds a predetermined threshold value. The range determining device may further include means for detecting when the difference in amplitude between one of the harmonic components relative to the amplitude of another of the harmonic components exceeds a second threshold value. The range determining device may further include means for detecting when the amplitude of one of the harmonic components is equal to the amplitude of another of the harmonic components to determine the instantaneous range of the object. The range determining device may further include means for detecting the difference in amplitude between one of the harmonic components and yet another harmonic component. The range determining device may include means, responsive to one of the harmonic components, for determining the time to the occurrence of predetermined relationship between the amplitudes of at least two of the harmonic components. The range determining device may include means for determining the distance to the object and the time to impact with the object. The decision device may include means responsive to the occurrence of a predetermined relationship, for determining that a collision is imminent. The detection device may include a mixer circuit for mixing the reflected modulated carrier signal with the modulated carrier signal to produce a composite Doppler signal. The mixer circuit may produce the harmonic components of the modulation signal of the composite Doppler signal. One of the harmonic components may be the second harmonic component of the modulation signal. Another of the harmonic components may be the first harmonic component of the modulation signal. Yet another of the harmonic components may be the DC component of the modulation signal. The transducer device may include an antenna device for transmitting the modulated carrier signal and for receiving the reflected modulated carrier signal. The transducer device may include oscillator means for producing a carrier signal, a modulation circuit for generating a modulation signal and mixing means for mixing the carrier signal and the modulation signal to produce a modulated carrier signal. The carrier signal may have a bandwidth of 100 MHz. The oscillator means may include a voltage controlled oscillator. The detection device may include a plurality of channels, each channel extracting the Doppler of one of a plurality of harmonic components from the modulation signal. Each of the plurality of channels may include a pulse shaping circuit. Each of the plurality of channels may include an amplifier circuit for varying the amplitude of the harmonic component thereby adjusting the relationship between the harmonic components relative to each other. The pulse shaping circuit may include means for rectifying each of the harmonic components. The range determining device may include detector means for detecting the peak amplitude of each harmonic component to produce a DC voltage signal for each harmonic component. The range determining device may further include analog to digital convertor means for converting the DC voltage signal to digital signal. One of the channels may extract the Doppler of the DC component of the modulation signal. One of the channels may extract the Doppler of the first harmonic component of the modulation signal. One of the channels may extract the Doppler of the second harmonic component of the modulation signal. The velocity measurement device may include a comparator device, responsive to one of the plurality of harmonic components, for providing a Doppler pulse each time the amplitude of the harmonic component exceeds a predetermined level for monitoring the relative velocity between the transducer device and the object. The velocity measurement device may further include a counting circuit responsive to the Doppler pulse for accumulating a number of clock pulses for a period of time defined by the Doppler pulse and a velocity calculation device, response to the counting circuit, for determining the relative velocity of the object. The range determining device further include a counter device responsive to the counting circuit for counting the Doppler pulses for a predetermined period of time after the amplitude of one of the harmonic components is equal to the amplitude of another of the harmonic components for indicating the instantaneous distance the transducer device and the object.

The invention also features an anticipatory collision detection system for a passenger restraint system including an object detection device for detecting the range and relative velocity of an object on a potential collision course. There is a decision device, responsive to the object detection device, for indicating to the passenger restraint system prior to impact with the object that impact with the object is imminent.

The object detection device may include a transducer device for transmitting a modulated carrier signal and receiving the reflected modulated carrier signal from an object, a detection device for detecting a plurality of Doppler shifted harmonic components from the reflected modulated carrier signal, a range determining device responsive to the amplitude of at least two of the harmonic components for determining the instantaneous range of the object and a velocity measurement device, responsive to the frequency of at least one of the harmonic components for determining the relative, instantaneous velocity of the object. The decision device may be responsive to the range determining device and the velocity measurement device for indicating that a collision with the object is imminent before contact is made with the object. The range determining device may include means for detecting when the amplitude of one of the harmonic components exceeds a predetermined threshold value. The range determining device further include means for detecting when the difference in amplitude between one of the harmonic components relative to the amplitude of another of the harmonic components exceeds a second threshold value. The range determining device may further include means for detecting when the amplitude of one of the harmonic components is equal to the amplitude of another of the harmonic components to determine the instantaneous range of the object. The range determining device may further include means for detecting the difference in amplitude between one of the harmonic components and yet another harmonic component. The range determining device may include means responsive to one of the harmonic components for determining the time to the occurrence of a predetermined relationship between the amplitudes of at least two of the harmonic components. The range determining device may include means for determining the distance to the object and the time to impact with the object. The decision device may include means responsive to the occurrence of a predetermined relationship, for determining that a collision imminent. The detection device may include a mixer circuit for mixing the reflected modulated carrier signal with the modulated carrier signal to produce a composite Doppler signal. The transducer device may include a voltage controlled oscillator for producing a carrier signal, a modulation circuit for generating a modulation signal and mixing means for mixing the carrier signal and the modulation signal to produce a modulated carrier signal. The mixing circuit may produce the harmonic components of the modulation signal of the composite Doppler signal. The detection device may include a plurality of channels, each channel dedicated to extracting one of a plurality of harmonic components from the modulation signal. One of the channels may extract the DC component of the modulation signal. One of the channels may extract the first harmonic component of the modulation signal. One of the channels may extract the second harmonic component of the modulation signal. The velocity measurement device may include a comparator device, responsive to one of the plurality of harmonic components, for providing a Doppler pulse each time the amplitude of the harmonic component exceeds a predetermined level for monitoring the relative velocity between the transducer device and the object. The velocity measurement device may include a counting circuit, responsive to the Doppler pulse, for accumulating a number of clock pulses for a period of time defined by the Doppler pulse and a velocity calculation device, responsive to the counting circuit, for determining the relative velocity of the object. The range determining device may further include a counter device, responsive to the counting circuit, for counting the Doppler pulses for a predetermined period of time after the amplitude of one of the harmonic components is equal to the amplitude of another of the harmonic components for indicating the instantaneous distance between the transducer device and the object.

The invention also features an anticipatory collision detection system for a passenger restraint system for an automobile which includes a transducer device for transmitting a modulated carrier signal and receiving the reflected modulated carrier signal from an object. There is a detection device for detecting a plurality of Doppler shifted harmonic components from the reflected modulated carrier signal. There is a range determining device, responsive to the amplitude of at least two of the harmonic components, for determining the instantaneous range of the object. There is a velocity measurement device responsive to the frequency of at least one of the harmonic components, for determining the relative, instantaneous velocity of the object. There is collision decision device, responsive to the range determining device and the velocity measurement device for indicating that a collision with the object is imminent before contact is made with the object.

DISCLOSURE OF PREFERRED EMBODIMENT

Other objects, features and advantages will occur to those skilled in the art from the following description of a preferred embodiment and the accompanying drawings, in which.

Figure 11:
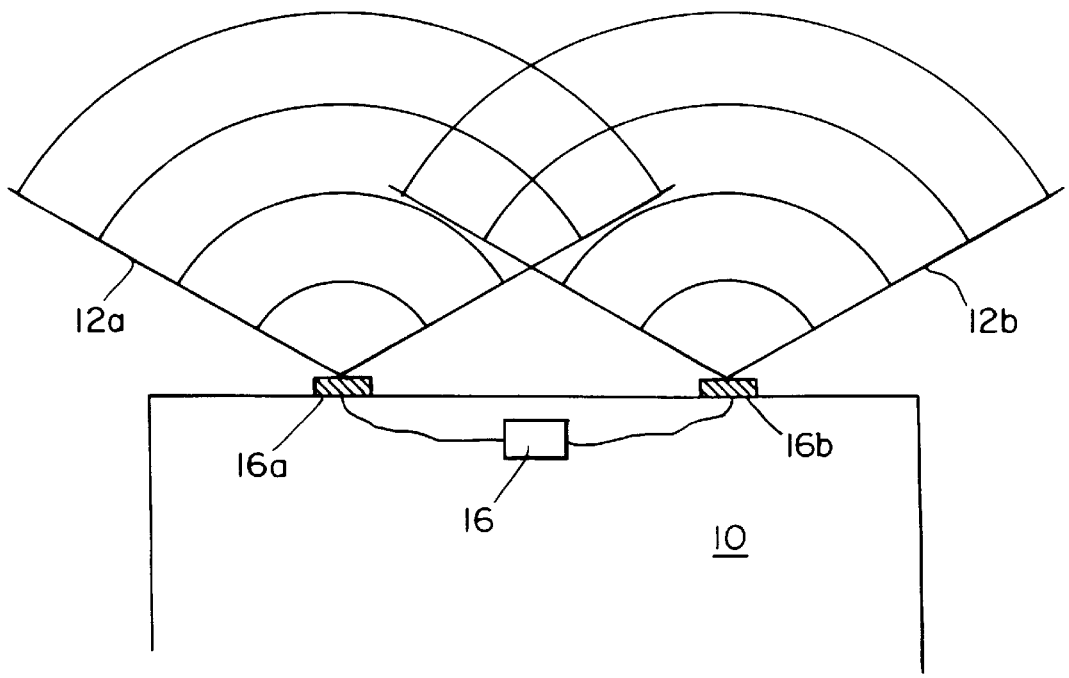
Figure 10:
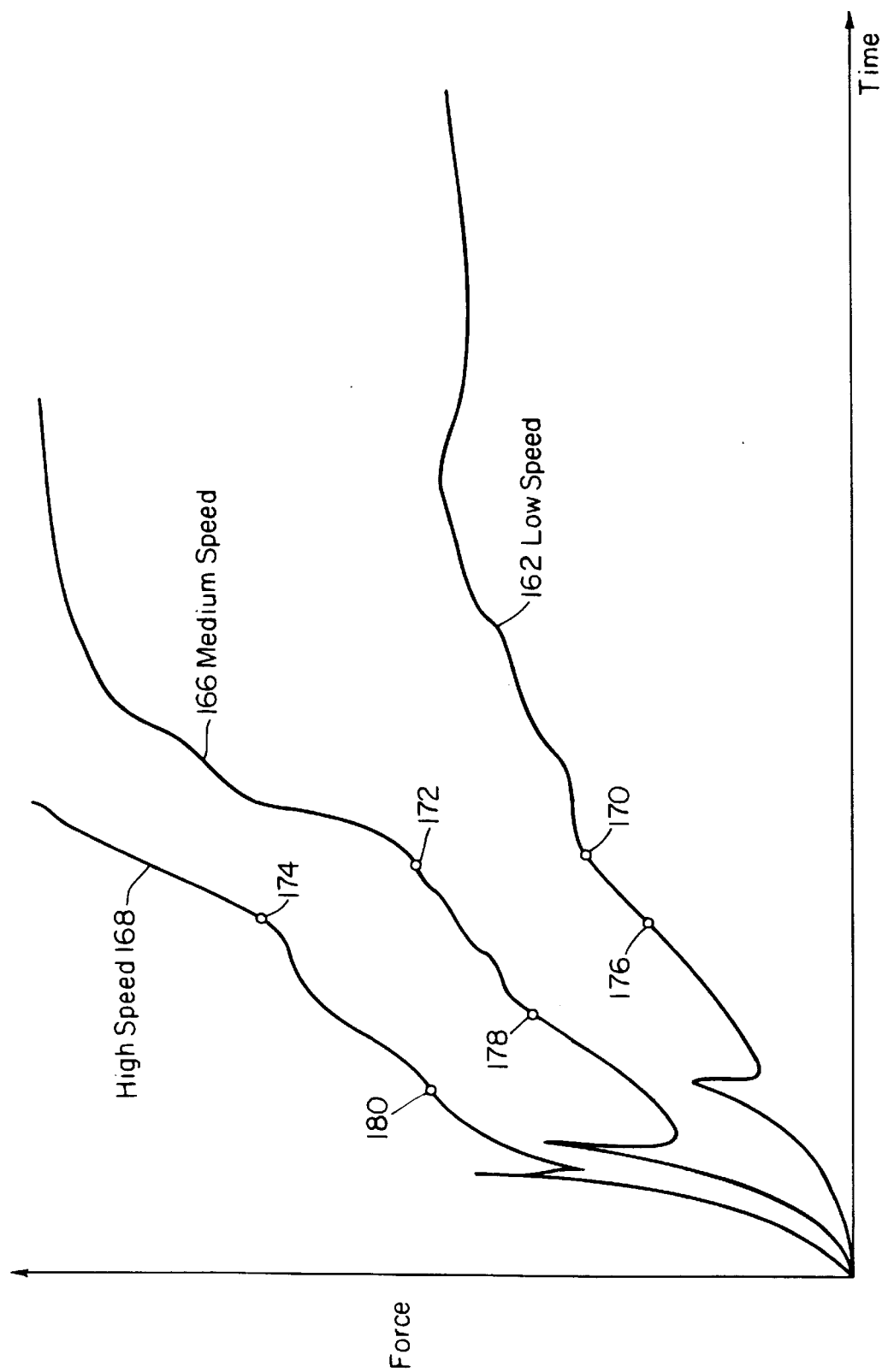

FIG. 10 is a graphic representation of g force sensor signals for low, medium and high speed collisions illustrating the various firing points of the passenger restraint system based on a detected relative velocity of the object compared to firing points based on actual collision with the object; and FIG. 11 is a top view of an automobile using the anticipatory collision sensor system according to this invention having two sensors.

Figure 1A:
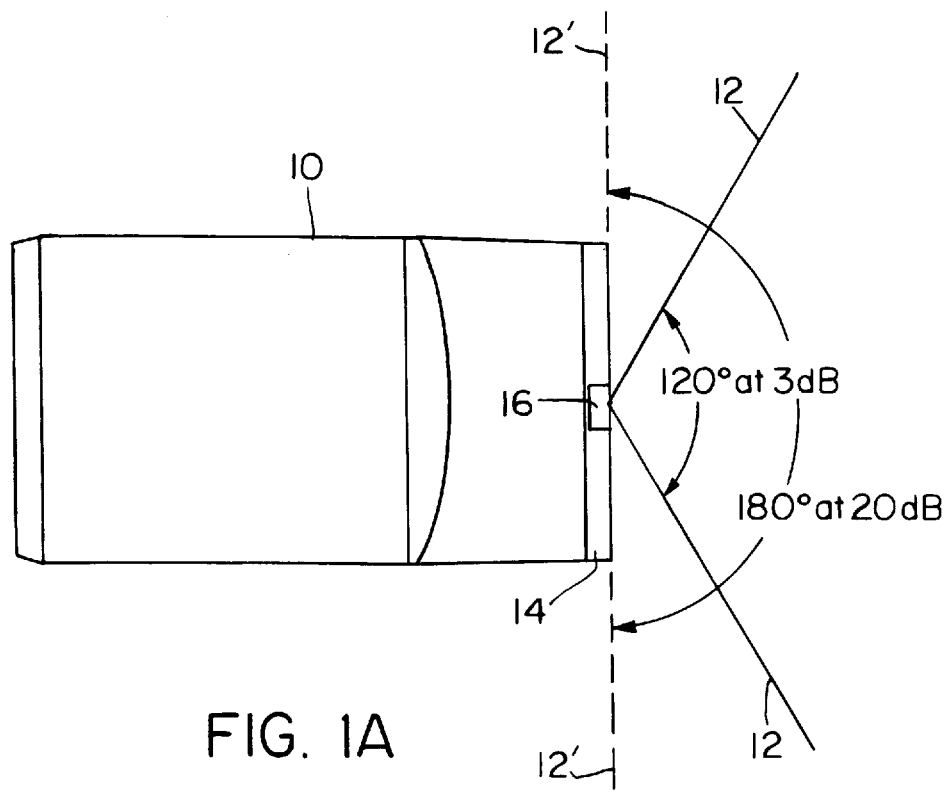
FIG. 1A is a top view of an automobile showing the horizontal field of view of the anticipatory object detection system of the present invention.

There is shown in FIG. 1A an anticipatory object detection system 16 centrally located within a bumper 14 of an automobile 10. Object detection system 16 transmits a radar signal which produces a radar cone 12 having a horizontal radiation cross section of 120° at 3 dB directed in front of automobile 10. However, at 20 dB the effective cross section or field of view is 180° and is represented by the dashed line 12'. It is the effective field of view 12' that allows the object detection system 16 to detect potential colliding objects directly in front of the automobile 10 as well as objects to either side of the automobile 10.

Figure 1B:
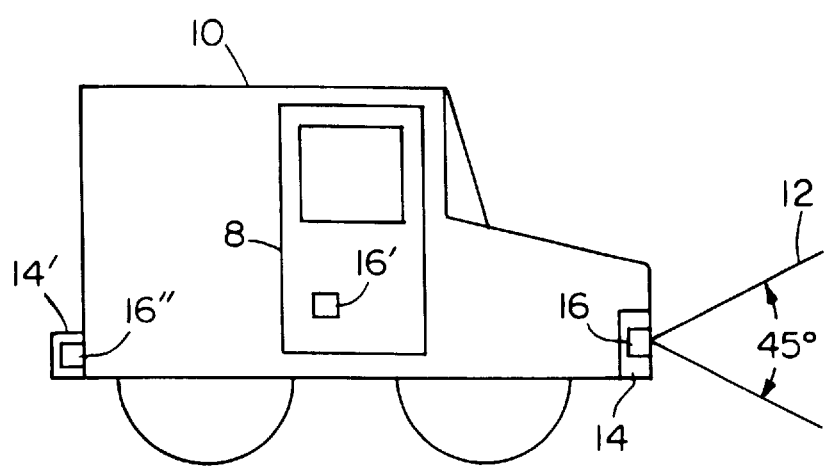
FIG. 1B is a side view of FIG. 1A and shows the vertical field of view of the object detection system of the present invention.

FIG. 1B is a side view of the automobile 10 of FIG. 1A. Object detection system 16 centrally located within bumper 14 produces the same radar cone 12 as shown in FIG. 1A, however, the vertical radiation cross section of the radar cone is 45°. Object detection system 16 may be adjusted to project a radar cone 12 a predetermined height and distance in front of the automobile 10. It should be noted that the object detection system 16 is not limited to being located in the front bumper. Anticipatory object detection system 16 may be located at any location that may potentially encounter a collision with an object. For example, object detection system 16' may be located within the doors 8 of the automobile 10 to detect a side impact, or in the rear bumper 14' to detect a collision from behind. The object detection system is generally located equidistant from the edges of the automobile. This allows not only symmetric protection around the automobile, but also the use of simpler software which reduces processing time by the microprocessor.

Figure 2:
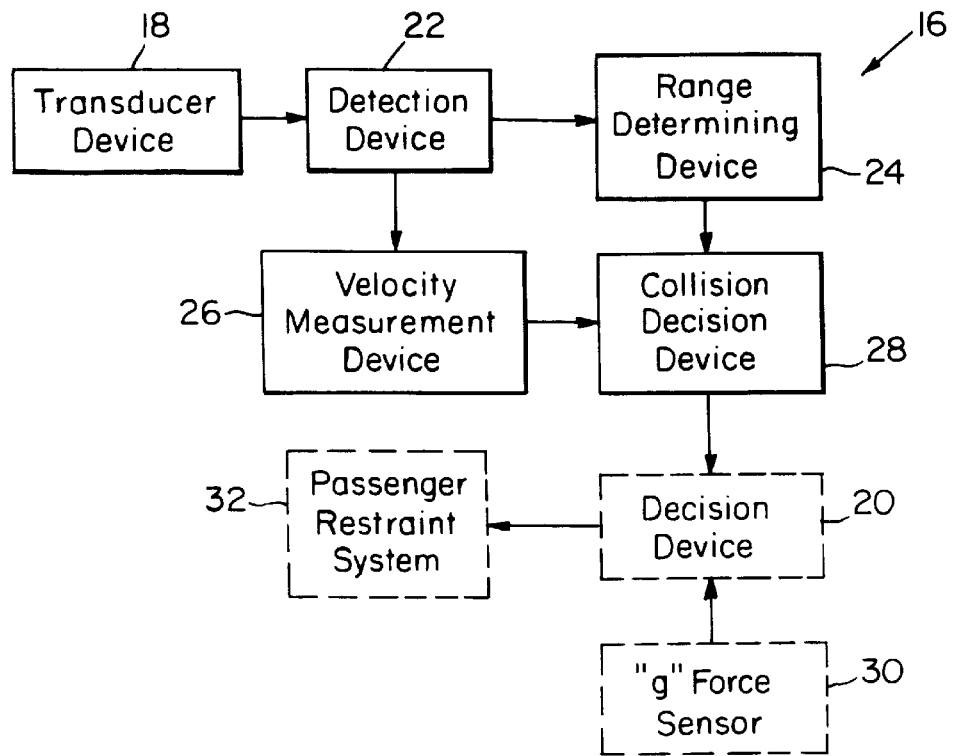
FIG. 2 is a simplified block diagram of an improved crash detection system using an anticipatory object detection system according to this invention.

Anticipatory object detection system 16 is shown in more detail in FIG. 2. A transducer device 18 transmits a modulated carrier signal, for example, a radar signal. The modulated carrier signal then encounters a potential colliding object within a predetermined range of transducer device 18 which reflects the signal. Due to the Doppler effect, the reflected signal will be shifted in frequency. The shift will be dependent on whether the object and vehicle are moving towards or away from each other. For example, for an object moving towards the object detection system 16 the frequency of the reflected signal will be higher than the frequency of the transmitted signal. For an object moving away from the object detection system 16 the frequency of the reflected signal will be lower than the frequency of the transmitted signal.

The reflected modulated carrier signal is received by transducer device 18, and a detection device 22 beats the received, reflected modulated carrier signal with the modulated carrier signal. This produces a composite Doppler signal having a frequency which is the frequency difference between the two signals, representing the Doppler shift of the reflected signal, and is comprised of a plurality of Doppler shifted harmonic components. This Doppler shift is present throughout the signal and thus present in all components of the signal. The Doppler frequency is represented by the envelope of the signals produced by detection device 22. Detection device 22 extracts the Doppler which envelops the harmonic components of the modulation signal of the Doppler signal. Once the Doppler is extracted, range determining device 24 determines the range of an object by comparing the amplitudes of the Doppler in each harmonic component relative to each other. When the object is within a predetermined range, defined by the intersection of two predetermined harmonic components, velocity measurement device 26 determines the relative velocity of the object using the Doppler frequency of the return signal as discussed in more detail in FIG. 4. Range determining device 24 continues to monitor the amplitudes of the Doppler of the harmonic components. The harmonic components are monitored by comparing their relationship relative to each other to predetermined values which represent what these amplitudes would be in an actual collision. Anticipatory collision decision device 28 determines that a collision is imminent, based on range information from range determining device 24 and velocity information from velocity measurement device 26, and sends a fire signal, along with relative velocity information, to a decision device 20, shown in phantom, typically part of an existing passenger restraint system. Decision device 20 receives this information along with information obtained from a conventional g force sensor 30, also shown in phantom. The g force sensor 30 is typically located within the passenger compartment. While the preferred embodiment is directed to an airbag passenger restraint system, anticipatory collision sensor system 16 may be used in conjunction with seatbelt pre-tensioners which tighten the seatbelts early in the collision prior to impact. Further, the anticipatory collision sensor system may be used as a primary sensor as well as a sensor for augmenting g force sensor 30 or as an audible or visual alarm.

Figure 3:
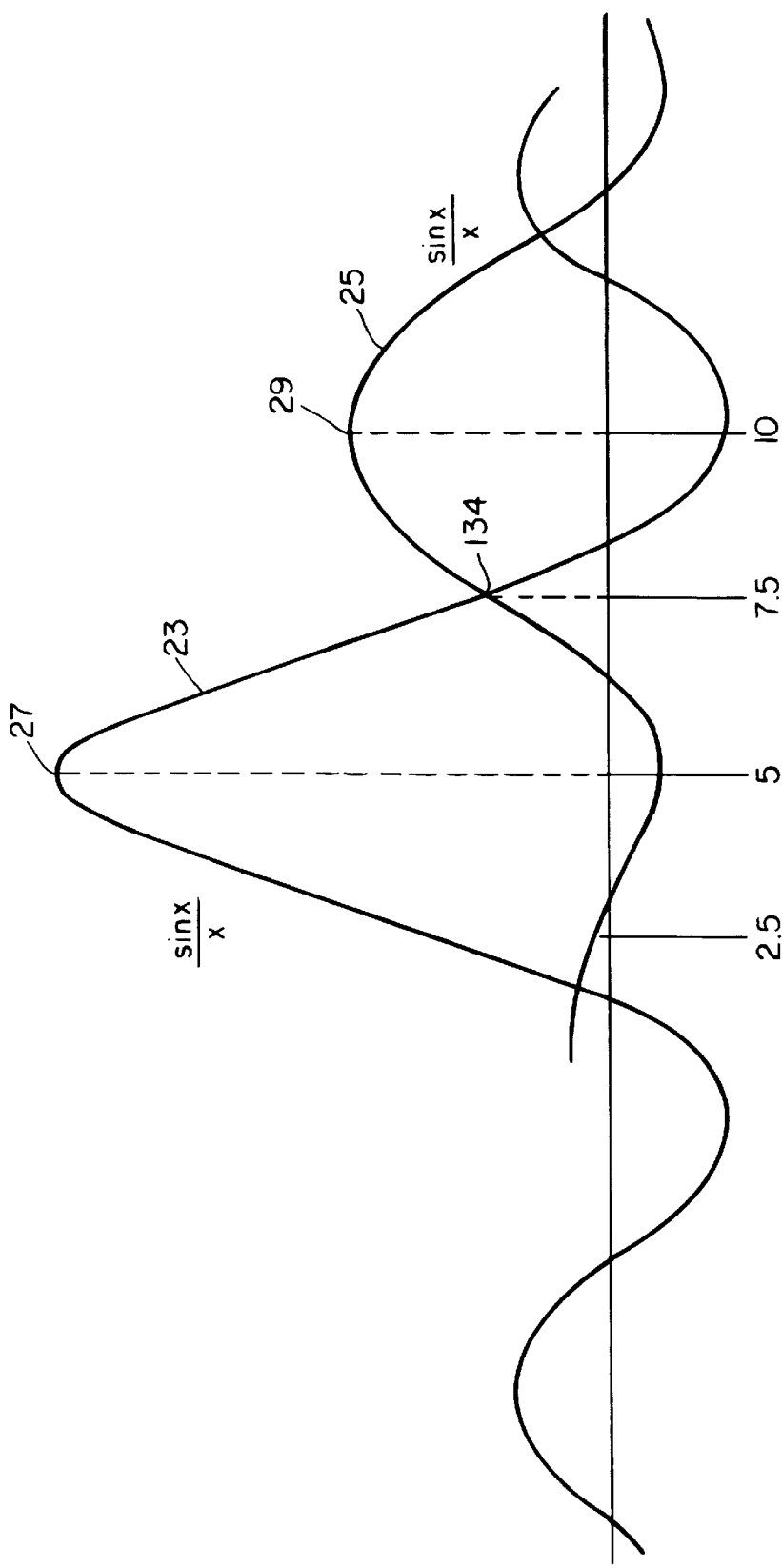
FIG. 3 is a representation of the actual amplitudes of the first and second harmonic components of the modulation signal of the Doppler signal.

The actual amplitudes of the first and second harmonic components of the modulation signal are represented by waveforms 23 and 25, as shown in FIG. 3, respectively. In a modulated carrier signal, the harmonic components of the modulation signal will peak at fixed distances for a given bandwidth of the carrier signal independent of frequency. For example, in a modulated carrier signal in which the carrier signal has a bandwidth of 100 MHz, the first harmonic component 23 of the modulation signal has a peak 27 at 5 feet. Similarly, the second harmonic component 25 of the modulation signal has a peak 29 at 10 feet. The point at which the two harmonic components intersect 134 will be ½ the distance between the peaks, or 7.5 feet. Therefore, for a signal reflected from an object, where the amplitudes of the first and second harmonic components of the modulation signal are equal, the instantaneous range of the object is known. The distances at which the amplitudes peak can be directly controlled by the bandwidth of the carrier signal. For example, a carrier signal having a bandwidth of 200 MHz would have a first harmonic component of the modulation signal peak at 2.5 feet and the second harmonic component would peak at 5 feet. Thus, the range of an object can be detected based solely on the bandwidth of the carrier signal regardless of the frequency of either the carrier signal or the modulation signal. Once the instantaneous range of an object is determined, the instantaneous range of the object can be tracked by counting the Doppler pulses, discussed in greater detail in FIG. 4, from that point on: each Doppler pulse represents the relative movement of the object in ½ inch increments. The range detected is the radial distance from the antenna.

Figure 4:
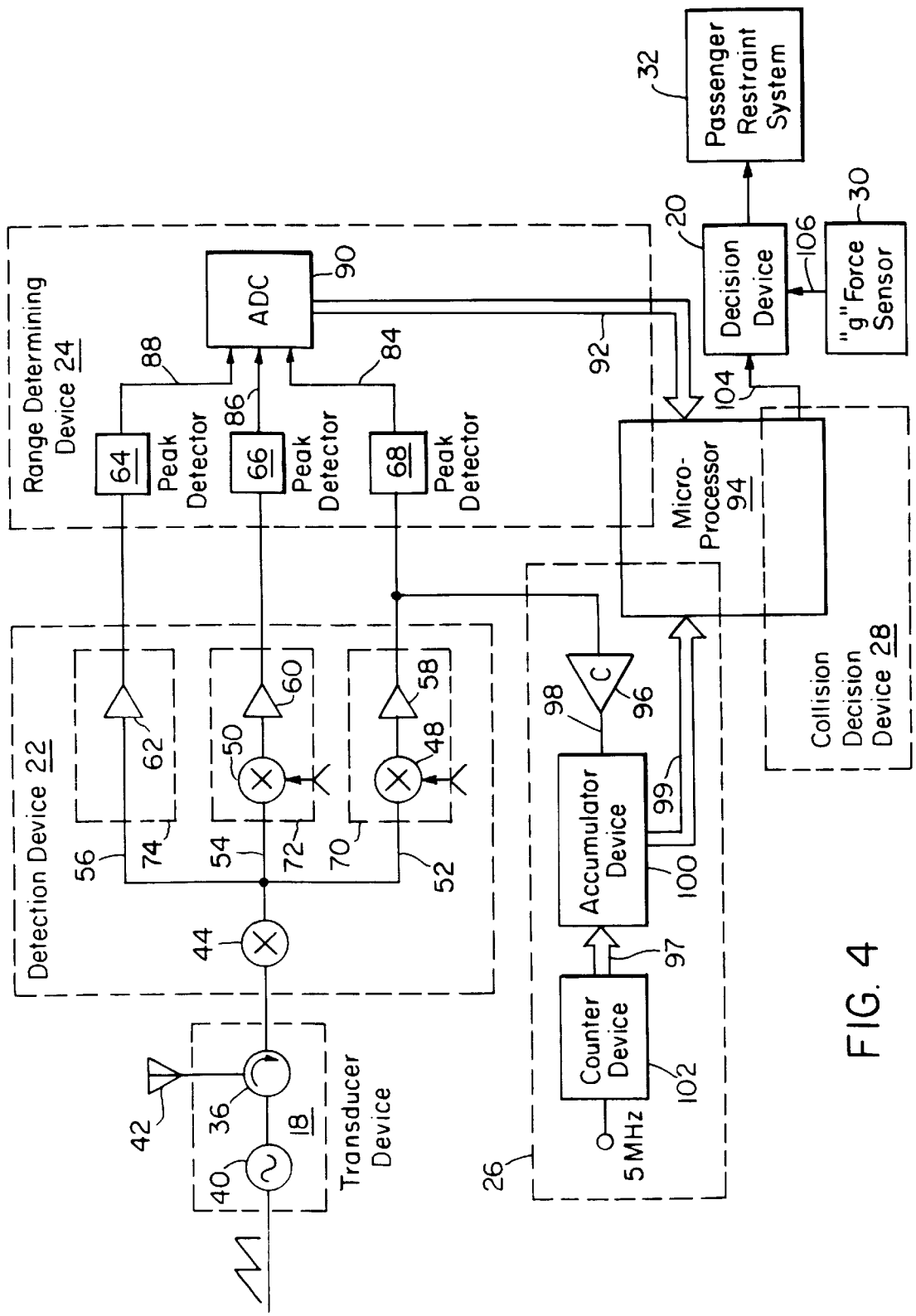
FIG. 4 is a more detailed schematic of the anticipatory object detection system according to this invention.

A more detailed schematic of the anticipatory collision detection system is shown in FIG. 4. Transducer device 18 includes a voltage controlled oscillator 40 which generates a carrier signal having a center frequency of 5.8 GHz. In order to remain within FCC guidelines for unlicensed sensor operation, the bandwidth of the signal must be such that the carrier signal stays within the range of 5.725 GHz to 5.875 GHz. In this embodiment, the carrier signal is modulated at a frequency of 156.25 KHz. The frequency range, or bandwidth, of voltage controlled oscillator 40 is dictated by the changes in amplitude of the modulation signal. The modulation frequency is typically chosen to be at least ten times larger than the Doppler frequency. It must be of sufficient frequency such that leakage throughout the system will not affect the Doppler frequency. A circulator 36 delivers the modulated carrier signal to antenna 42.

Antenna 42 transmits the modulated 5.8 GHz carrier signal, which is reflected off objects within a predetermined range, typically two to ten feet away to just beyond the bumper. The reflected signal is then received by antenna 42. The transducer device of the preferred embodiment is provided in a single MMIC radar chip manufactured by Hittite Corporation of Massachusetts and includes a single transmit/receive antenna. However, independent transmit and receive antennas may be used. It is important, however, that a broad beam antenna is used to provide sufficient field view of the system.

Detection device 22 beats the received signal with the modulated carrier signal using mixer 44. The local oscillator for mixer 44 is provided by the leakage of the modulated carrier signal from circulator 36. Mixer 44 produces a beat frequency, or composite Doppler signal, which is the frequency difference between the modulated carrier signal and the received reflected signal. The composite Doppler signal is comprised of a plurality of signals to include the harmonic components of the reflected modulation frequency. The frequency of the harmonics of the modulation frequency present in the composite Doppler signal differ from the modulation frequency by the Doppler frequency.

Figure 5:
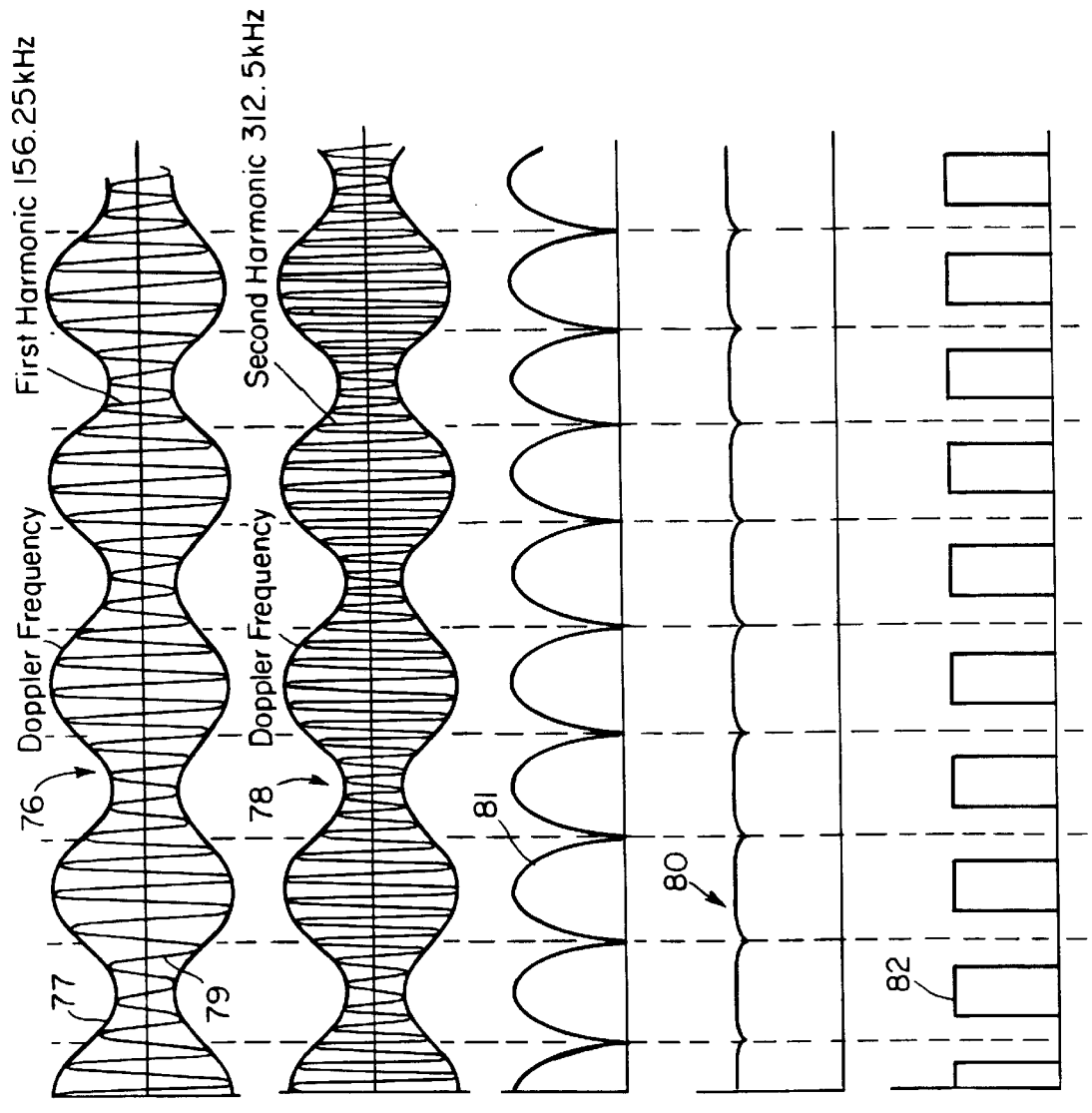
FIG. 5A is a representation of the first harmonic of the modulation signal of the Doppler signal received from a potential colliding object, the envelope of which represents the Doppler shift.
FIG. 5B is a representation of the second harmonic of the modulation signal of the Doppler signal received from a potential colliding object, the envelope of which represents the Doppler shift.
FIG. 5C is a representation of the demodulated $K^{th}$ harmonic of the Doppler frequency.
FIG. 5D is a representation of a filtered harmonic which provides a DC voltage signal of that harmonic.
FIG. 5E is a representation of the output from a comparator circuit which provides a Doppler pulse of the same frequency as the Doppler.

For purposes of this embodiment, the harmonic components of interest are the first harmonic component, second harmonic component and the DC harmonic component of the modulation signal. Detection device 22 contains a plurality of signal paths 52, 54, and 56 which deliver the Doppler shifted harmonic components to a plurality of channels 70, 72, and 74 respectively, for extracting the Doppler from the harmonic components. In a preferred embodiment, channel 70 contains a mixer 48 which mixes the Doppler shifted first harmonic component, represented by waveform 76 as shown in FIG. 5A, with the modulation signal, 156.25 KHz: Envelope 77 represents the Doppler frequency while the first harmonic is represented by waveform 79. This demodulation extracts the Doppler of the first harmonic component of the modulation signal, or first Doppler, the envelope of the Doppler shifted harmonic component. Channel 70 also includes a Doppler amplifier 58 which includes a pulse shaping circuit that amplifies and rectifies the first Doppler. This signal is represented by waveform 81 as shown in FIG. 5C. Thus, this signal has the frequency of the Doppler frequency and the amplitude represents the variations of the first harmonic component of the modulation signal of the reflected signal. The Doppler amplifier 58 supplies the amplified, rectified, first Doppler to a range determining device 24. Range determining device 24 includes a peak detector 68 which includes an RC network which produces a DC voltage as illustrated by waveform 80 in FIG. 5D.

In a similar manner as channel 70, channel 72 contains a mixer 50 which mixes the Doppler shifted second harmonic component, represented by waveform 78 as shown in FIG. 5B, with a signal which is twice the frequency of the modulation signal, 312.5 KHz. This demodulation produces the Doppler of the second harmonic component, or second Doppler, of the modulation signal. Channel 72 also contains Doppler amplifier 60 which includes a pulse shaping circuit which amplifies and rectifies the second Doppler. This signal is similar to that illustrated by waveform 81 in FIG. 5C. The amplified, rectified second Doppler is then delivered to range determining device 24. Range determining device 24 includes a peak detector 66, similar to peak detector 68, which produces a DC voltage output similar to that illustrated by waveform 80 of FIG. 5D.

Channel 74 includes a Doppler amplifier 62 which amplifies and rectifies the Doppler signal to produce the Doppler of the direct current (DC) or fundamental harmonic component, or DC Doppler, of the reflected modulation signal. The DC Doppler is delivered to peak detector 64, similar to peak detectors 66 and 68, to produce a DC voltage similar to waveform 80 of FIG. 5D.

The DC voltage signals of the first Doppler, second Doppler, and DC Doppler are delivered to an analog to digital converter 90 via signal paths 84, 86 and 88 respectively. Analog to digital converter 90 converts the DC voltages to digital signals which it then supplies to a microprocessor 94 via signal bus 92. Microprocessor 94, through the implementation of software discussed below, monitors the Doppler amplitude of each harmonic component and its relationship with the Doppler amplitudes of the other harmonic components to determine the instantaneous range of an object. The instantaneous range is determined using intersection of the first and second Doppler amplitudes. The amplitude, phase, and relative Doppler sideband character of each of the harmonic components are a function of object range, relative velocity magnitude and sense, and peak to peak frequency deviation. Once a predetermined relationship between the harmonics is detected, microprocessor 94 enables velocity measurement device 26 to determine the instantaneous velocity of the object.

Velocity measurement device 26 includes a comparator device 96. In one embodiment, comparator 96 is connected to the output of channel 70 of detection device 22 since the first harmonic component has the greatest amplitude. However, comparator 96 may be placed at the output of either channel 72 or 74. Comparator 96 receives the amplified, rectified first Doppler and compares the level of that output to a predetermined value. If the level of the input exceeds a predetermined value, comparator 96 outputs a high signal. If the input does not exceed the predetermined value, comparator 96 outputs a low value. The resulting output, a series of Doppler pulses illustrated by waveform 82 as shown in FIG. 5E, is delivered over signal path 98 to velocity measurement device 26. Velocity measurement device 26 includes a velocity measurement circuit having an accumulator device 100, such as a capture register, which is driven by the Doppler pulse supplied over signal path 98. Velocity measurement device 26 also includes a counter device 102 interconnected with accumulator device 100 via signal bus 97. Counter device 102, driven by an internal 5 MHz clock, continuously counts the cycles of the 5 MHz clock. With every rising edge of the Doppler pulse from comparator 96, accumulator device 100 sends an interrupt to microprocessor 94, a portion of which is shared with range determining device 24, and simultaneously reads counter device 102 and stores the number of cycles counted. With every interrupt received by microprocessor 94 from accumulator device 100 microprocessor 94 reads the cycle count stored in accumulator device 100, resets counter device 102 and increments a Doppler count by 1. The Doppler count represents the number of Doppler pulses received. Thus, velocity measurement device 26 counts the number of 5 MHz clock pulses that occur for each Doppler pulse. Since the Doppler pulse is derived from a rectified Doppler component, each pulse represents one half Doppler cycle. The process is repeated with each rising edge of the Doppler pulse, each 5 MHz cycle count being added to the previous cycle count stored in microprocessor 94, until the Doppler count is equal to 4. Once the Doppler count equals 4, the microprocessor 94 discontinues reading accumulator device 100 and divides by 4 the total count stored to provide an average 5 MHz cycle count. Microprocessor 94 then refers to a look up table to determine what velocity is associated with that average count. While there are many ways the velocity may be calculated, the look up table provides a fast and accurate method without tying up the microprocessor. Accumulator device 100 continues to send an interrupt to microprocessor 94 with every rising edge of the Doppler pulse. Although the microprocessor no longer reads accumulator device 100, with every interrupt it receives from accumulator device 100, microprocessor 94 continues to increment the Doppler count. The Doppler count represents the number of Doppler pulses received, each pulse being equivalent to 0.5 inches of relative movement by the object; each Doppler cycle is one half the wavelength of the 5.8 GHz carrier signal. Thus, once the intersection of the first and second Doppler is detected, giving an instantaneous range of the object, the object's range thereafter can be tracked by counting the Doppler pulses reflected from the object.

While the velocity is being determined, microprocessor 94, a portion of which is included in a collision decision device 28, continues to monitor the amplitude of the Doppler. When collision decision device 28 has determined that a collision is imminent, a fire signal along with the velocity information is sent to decision device 20 via signal path 104. In the preferred embodiment microprocessor 94, analog to digital converter 90, counter device 102 and accumulator device 100 are contained in a single chip, Model PIC16C74, available from Microchip of Chandler, Ariz.

Figure 6:
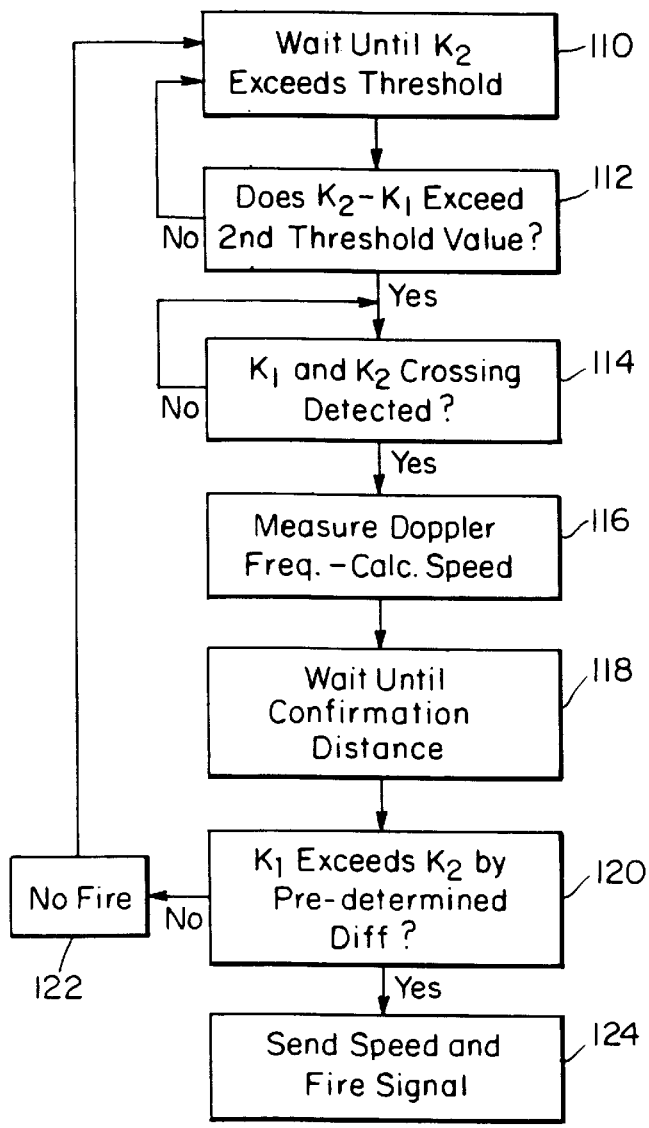
FIG. 6 is a flow chart of the algorithm used by the range determining device to monitor the amplitude of the Doppler in the first and second harmonic components of the modulation signal of the Doppler signal to determine that a collision is imminent.

The software implemented by microprocessor 94 to monitor the Doppler amplitudes of the harmonic components is illustrated by the flow chart of FIG. 6. In block 110 microprocessor 94, FIG. 4, monitors the amplitude of the second Doppler, K2, to determine when it exceeds a predetermined threshold value. Once this threshold value has been exceeded the microprocessor monitors the difference between K2 and the amplitude of the first Doppler, K1, to determine whether that difference exceeds a second threshold value, block 112. If that second threshold value is not exceeded, the software returns to block 110 continuing to monitor K2. However, if the difference between the two harmonic components exceeds the second threshold value, microprocessor 94, FIG. 4, monitors K2 and K1, to detect when K1 equals K2, block 114, at which point the instantaneous range of the object is known. If K1 equals K2, block 114, microprocessor 94 initializes velocity measurement device 26, FIG. 4, to measure the Doppler frequency and determine the instantaneous, relative velocity of the object, block 116. Once the velocity calculation has been initiated, block 116, the microprocessor waits for a confirmation distance, block 118. This confirmation distance is determined by counting the Doppler pulses, each pulse translating to 0.5 inches of relative movement, from the intersection of K1 and K2 where the range is known. Once that confirmation distance has been achieved, the K1 and K2 components are compared to determine whether the K1 component exceeds K2 by a predetermined difference, block 120, which difference represents the difference that would occur in an actual collision given the same velocity. If that difference is detected, a fire signal and velocity information are sent to decision device 20, FIG. 4. If K1 does not exceed K2 by a predetermined difference, block 120, then no fire signal is sent, block 122, which indicates that no collision will occur, and the microprocessor returns to monitoring K2, block 110.

Figure 7:
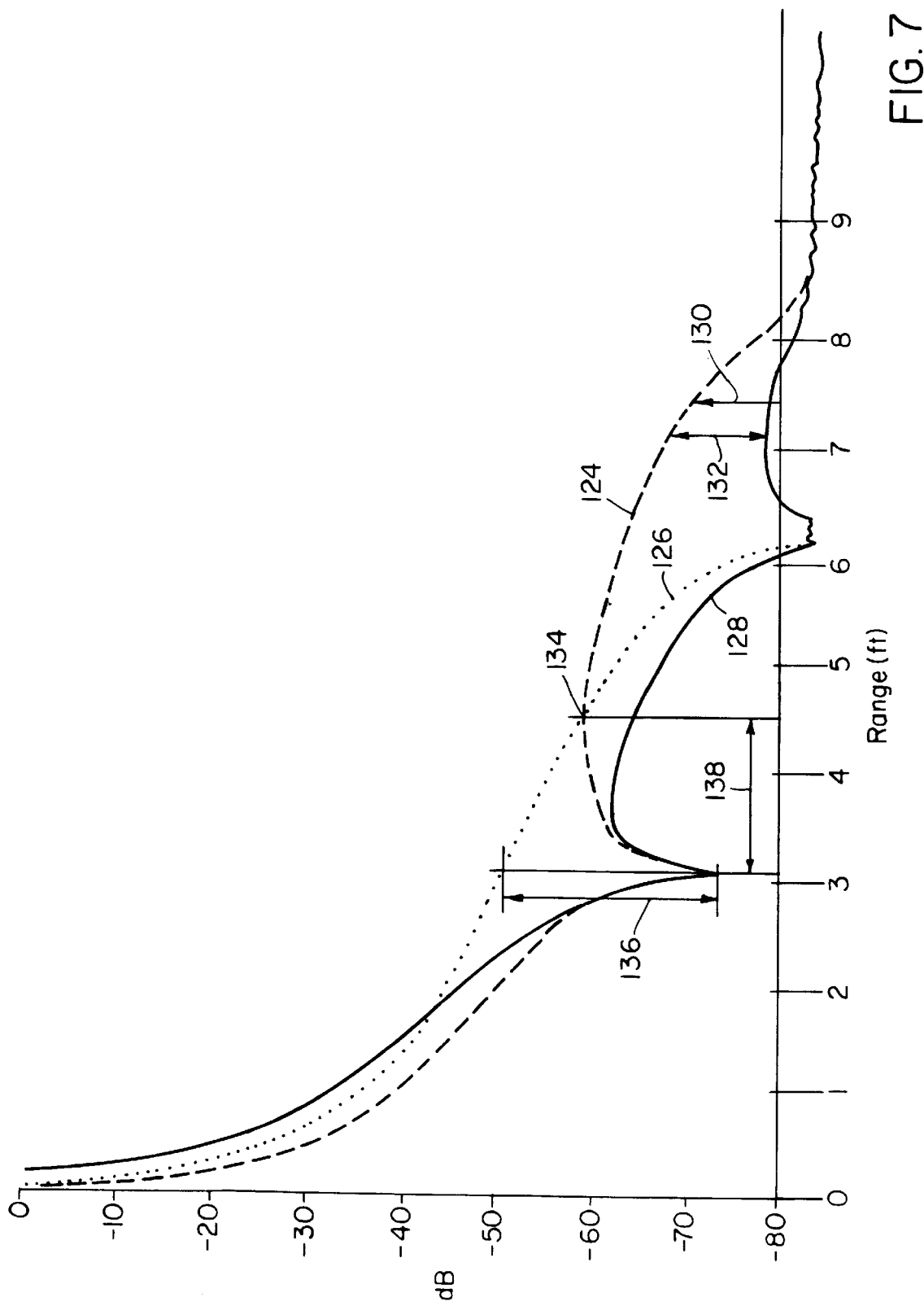
FIG. 7 is a graphic representation of the typical amplitudes of the Doppler in each harmonic relative to each other.

An example of the Doppler amplitudes microprocessor 94, FIG. 4, is looking for is illustrated in FIG. 7. When the amplitude of the second Doppler 124 exceeds a predetermined threshold value 130 the microprocessor monitors the difference between the amplitudes of the second Doppler 124 and the first Doppler 128 until there is detected a second threshold value 132, which represents the predetermined difference. Once this second threshold value 132 is detected, the microprocessor monitors the amplitude of the second Doppler 124 and the amplitude of the first Doppler 126 to detect when the amplitudes are equal. This is represented by crossing 134. Once crossing 134 has been detected, the microprocessor monitors the amplitude of the second Doppler 124 and the amplitude of the first Doppler 126 for a confirmation distance 138. This confirmation distance is generally equal to the distance from the sensor system to just beyond the edge of the automobile. Once the microprocessor has waited for the confirmation distance 138 it compares the amplitude of the second Doppler 124 with the amplitude of the first Doppler 126 looking for a predetermined difference 136 which represents the difference which would occur in an actual collision. When predetermined difference 136 has been detected at the confirmation distance 138, microprocessor 94, FIG. 4, determines that a collision is imminent and sends a fire signal to the decision device 20, FIG. 4.

It should be noted that amplification of the Doppler components can be used to vary their relationships with each other and thus shift crossing 134 to a desired distance as well as confirmation distance 138. This simple gain adjustment using amplifiers 58–62 provides a degree of freedom for various pre-crash sensing applications where a single sensor is mounted in the center of a bumper of the automobile. Because the typical width of an automobile is 4 to 5 feet, the decision must be made just beyond the edge of the automobile so as not to induce false alarms. Thus, the system can be easily adapted for any size automobile.

Figure 8A:
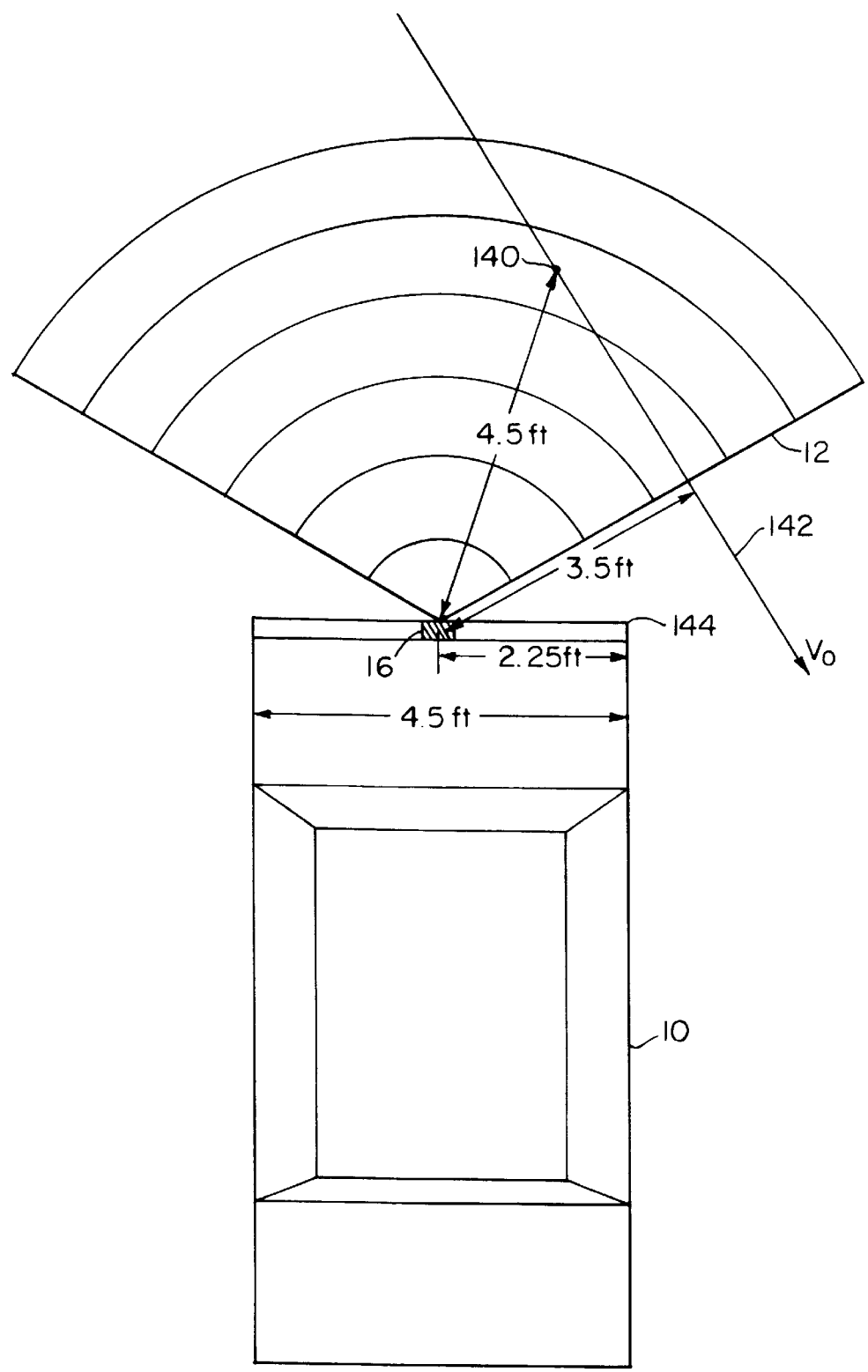
FIG. 8A illustrates an automobile on a potential collision course with an object, but does not impact that object.
Figure 8B:
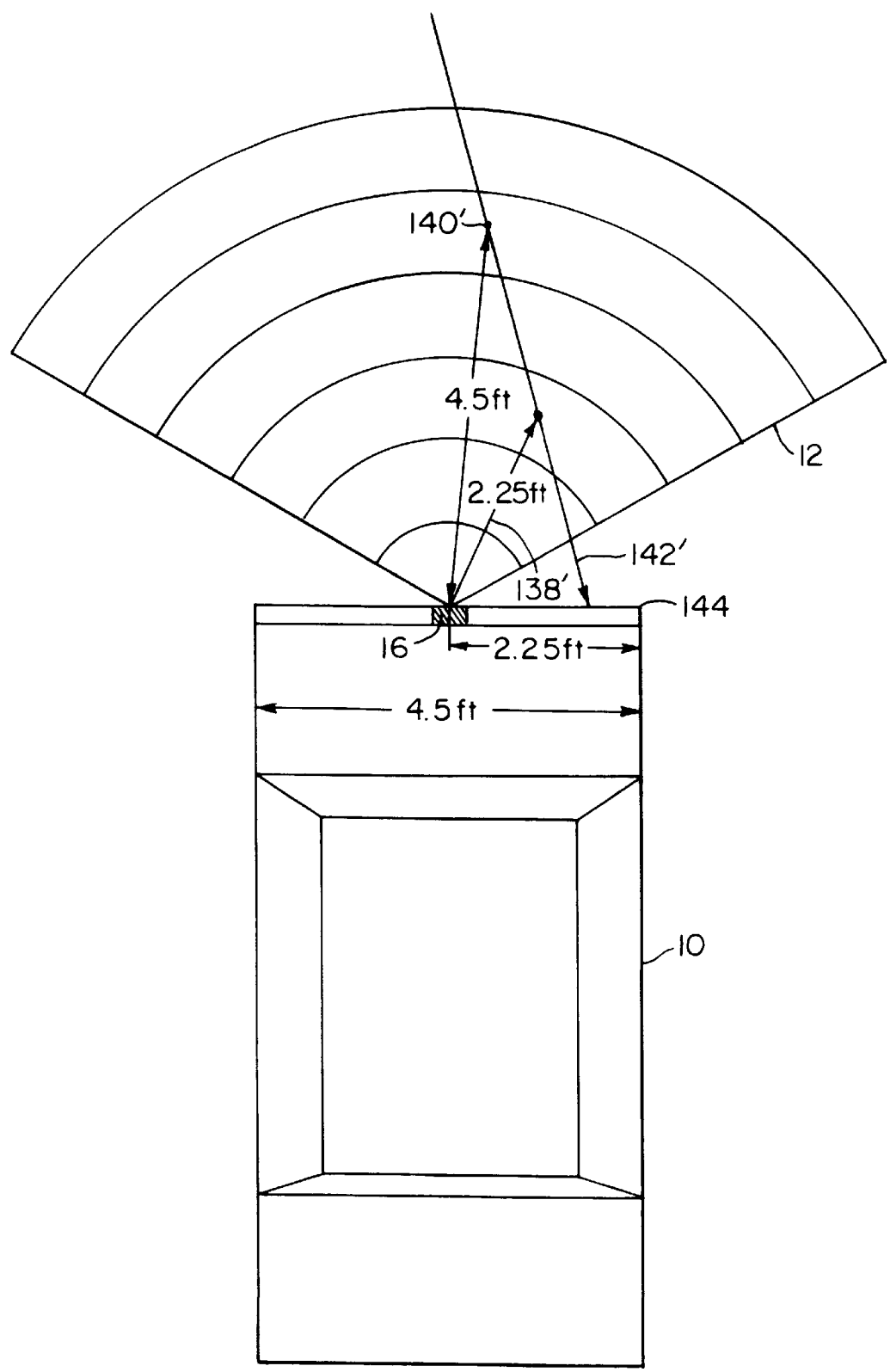
FIG. 8B is an illustration of an automobile on a potential collision course with an object, similar to FIG. 8A, which does impact the object.

The manner of detecting a collision or no collision condition can be understood more clearly with reference to FIGS. 8A and 8B. In FIG. 8A, there is an anticipatory collision sensor system 16 mounted in an automobile 10 producing a radar cone 12. An object 140 is detected at a distance 4.5 feet from the sensor system 16 and moving in a direction indicated by an arrow 142. The Doppler amplitudes of the harmonics of the signal reflected by object 140 are monitored by the microprocessor to determine when the amplitude of the second Doppler 124, FIG. 7, exceeds the threshold value 130, FIG. 7. Once that threshold value is exceeded the microprocessor continues to monitor the Doppler amplitudes of the harmonics, as discussed above. When crossing point 134, FIG. 7, has been detected, the instantaneous range of the object is 4.5 feet, as discussed in FIG. 3, and the microprocessor waits for a confirmation distance. The confirmation distance of FIG. 8A is 2.25 feet which is the distance from the anticipatory collision sensor system 16 to the edge of the bumper 144. As can be seen, the direction of movement 142 is such that object 140 will not intersect with the automobile 10. Thus, the Doppler amplitude of the harmonic components at the confirmation distance of 2.25 feet will not equal the amplitudes which would occur in an actual collision. Therefore, no collision is detected and the microprocessor returns to monitoring the amplitude of the second Doppler until it exceeds the predetermined threshold value, block 110 FIG. 6.

There is shown in FIG. 8B, the same automobile 10 of FIG. 8A and an object 140' moving in a direction indicated by arrow 142'. The Doppler amplitudes of the harmonic components of the reflected signal are monitored by the microprocessor to detect when the amplitude of the second Doppler exceeds a predetermined threshold value 130, FIG. 7. The Doppler amplitudes of the harmonic components continue to be monitored as discussed above. When crossing 134, FIG. 7, the object is detected at 4.5 ft. The microprocessor waits a confirmation distance 138' and compares the amplitude of the first Doppler 126, FIG. 7, to the amplitude of the second Doppler 124, FIG. 7, to determine if the amplitude of the first Doppler exceeds the amplitude of the second Doppler by predetermined difference 136, FIG. 7. When the microprocessor detects the predetermined difference it determines that a collision with the object is imminent and sends a fire signal and velocity information to the decision device, block 124, FIG. 6.

Figure 9:
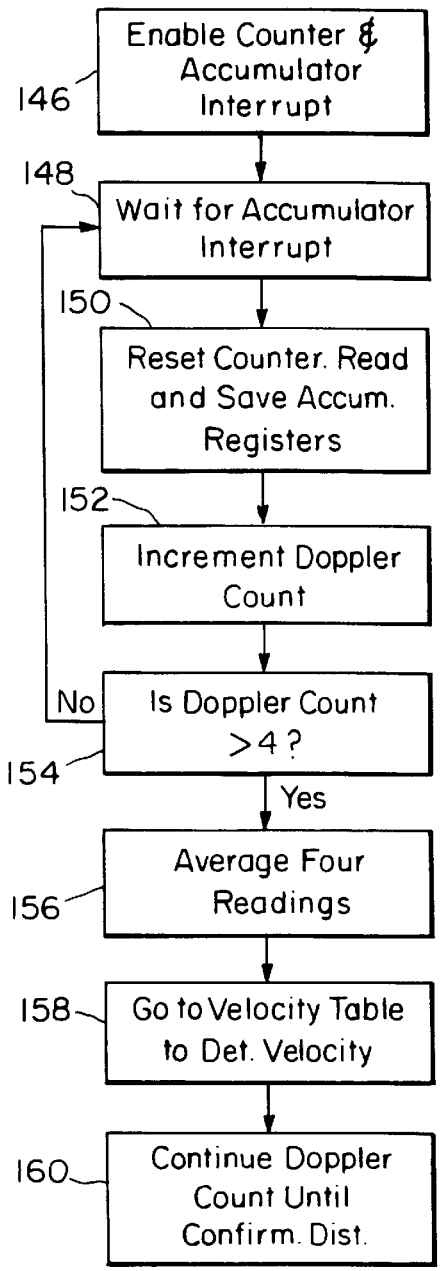
FIG. 9 is a flow chart of the velocity measurement steps taken by the velocity measurement device according to this invention.

The flow chart of the velocity measurement steps taken by velocity measurement device 26, FIG. 4, is shown in FIG. 9. Once crossing 134, FIG. 7, is detected, the counter device and accumulator device are enabled by the microprocessor, block 146. The microprocessor waits for an interrupt from the accumulator device, FIG. 4. When the interrupt is received, the microprocessor resets the counter device and reads and saves the clock cycle count stored in the accumulator device, block 150, adding it to the previous count. The microprocessor increments the Doppler count by 1, block 152, and compares the Doppler count to determine whether it is greater than 4, block 154. If the Doppler count does not exceed 4 the routine returns to block 148 to wait for the next interrupt. However, if the Doppler count is greater than 4, the microprocessor divides the total number of 5 MHz cycles by 4 to obtain an average clock cycle count over 4 readings of the 5 MHz clock, block 156. The microprocessor compares the average clock cycle count to a look up table to determine the relative velocity of the object, block 158. The microprocessor discontinues reading the accumulator device, but increments the Doppler count with each interrupt received from the accumulator counting Doppler pulses until the confirmation distance has been reached, block 160. At this point, it determines whether or not a collision is imminent and either a fire signal, along with the velocity information, will be sent to the decision device, block 124 FIG. 6, or a no fire signal will be sent, block 122 FIG. 6.

A graphic representation of g force sensor signals for low speed 162, medium speed 166, and high speed 168 collisions based on empirical data of actual crashes can be seen in FIG. 10. Firing points 170, 172 and 174 correspond to typical points during a crash event at which the g sensor will send a fire signal to the passenger restraint system for low speed 162, medium speed 166, and high speed 168 collisions, respectively, based on the g forces the automobile is actually undergoing. In contrast, firing points 176, 178 and 180 represent the firing points for low speed 162, medium speed 166 and high speed 168 collisions as determined by the anticipatory collision sensor system according to this invention. For example, because a collision can be anticipated and determined to be imminent the passenger restraint system may fire at a point 176 which is much earlier in the crash event than the typical firing point 170 as determined by the g force sensor. In other words, whereas the g force sensor cannot determine the severity of the collision until a point in time 170 as a crash occurs, the anticipatory collision sensor system can determine the severity of the collision, based on the relative velocity of the object, at a point in time 176 before the collision takes place. This reduces the time to fully deploy the airbag, thereby allowing full deployment of the airbag before the occupants have shifted position due to the collision. This allows the passenger to remain at a safer distance from the airbag as it inflates. This also permits variable inflation rates of the airbag, while allowing it to inflate sufficiently in time to restrain the occupants. It should be noted that firing points 176, 178 and 180 are based on the relative velocity of the object and the distance of the object and are not arbitrary firing points.

Referring to FIG. 11, there is shown an automobile 10 equipped with an anticipatory collision sensor system 16 having sensors 16A and 16B, which emit radar cones 12A and 12B respectively. The system operates in a manner similar to the single sensor system discussed above.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An anticipatory object detection system comprising:
   a transducer device for transmitting a modulated carrier signal and receiving the reflected modulated carrier signal from an object;
   a detection device for detecting a plurality of Doppler shifted harmonic components from said reflected modulated carrier signal;
   a range determining device responsive to the amplitudes of at least two of said harmonic components being equal for determining the instantaneous range of said object and, a predetermined distance thereafter, to a predetermined difference between the amplitudes of at least two of said harmonic components;
   a velocity measurement device, responsive to the frequency of at least one of said harmonic components, for determining the relative, instantaneous velocity of said object; and
   a collision decision device, responsive to said range determining device and said velocity measurement device for indicating that a collision with said object is imminent before contact is made with said object.

2. The anticipatory object detection system of claim 1 further comprising a passenger restraint system for an automobile.

3. The anticipatory object detection system of claim 1 in which said range determining device includes means for detecting when the amplitude of one of said harmonic components exceeds a predetermined threshold value.

4. The anticipatory object detection system of claim 3 in which said range determining device further includes means for detecting when the difference in amplitude between said one of said harmonic components relative to the amplitude of another of said harmonic components exceeds a second threshold value.

5. The anticipatory object detection system of claim 4 in which said range determining device further includes means for detecting when the amplitude of said one of said harmonic components is equal to the amplitude of said another of said harmonic components to determine the instantaneous range of said object.

6. The anticipatory object detection system of claim 5 in which said range determining device includes means, responsive to one of said harmonic components, for determining the time to the occurrence of a predetermined relationship between the amplitudes of at least two of said harmonic components.

7. The anticipatory object detection system of claim 6 in which said range determining device includes means for determining the distance to said object and the time to impact with said object.

8. The anticipatory object detection system of claim 7 in which said decision device includes means responsive to said occurrence of a predetermined relationship, for determining that a collision is imminent.

9. The anticipatory object detection system of claim 8 in which said velocity measurement device includes a comparator device, responsive to one of said plurality of harmonic components, for providing a Doppler pulse each time the amplitude of said harmonic component exceeds a predetermined level for monitoring the relative velocity between said transducer device and said object.

10. The anticipatory object detection system of claim 9 in which said velocity measurement device further includes a counting circuit responsive to said Doppler pulse for accumulating a number of clock pulses for a period of time defined by said Doppler pulse and a velocity calculation device, responsive to said counting circuit, for determining the relative velocity of said object.

11. The anticipatory object detection system of claim 10 in which said range determining device further includes a counter device responsive to said counting circuit for counting said Doppler pulses for a predetermined period of time after the amplitude of said one of said harmonic components is equal to the amplitude of said another of said harmonic components for indicating the instantaneous distance between said transducer device and said object.

12. The anticipatory object detection system of claim 8 in which said detection device includes a mixer circuit for mixing said reflected modulated carrier signal with said modulated carrier signal to produce a composite Doppler signal.

13. The anticipatory object detection device of claim 12 in which said mixer circuit produces the harmonic components of the modulation signal of said composite Doppler signal.

14. The anticipatory object detection system of claim 13 in which said one of said harmonic components is the second harmonic component of said modulation signal.

15. The anticipatory object detection system of claim 14 in which said another of said harmonic components is the first harmonic component of said modulation signal.

16. The anticipatory object detection system of claim 15 in which said yet another of said harmonic components is the DC component of said modulation signal.

17. The anticipatory object detection system of claim 16 in which said transducer device includes an antenna device for transmitting said modulated carrier signal and for receiving said reflected modulated carrier signal.

18. The anticipatory object detection system of claim 17 in which said transducer device includes oscillator means for producing a carrier signal, a modulation circuit for generating a modulation signal and mixing means for mixing said carrier signal and said modulation signal to produce a modulated carrier signal.

19. The anticipatory object detection system of claim 18 in which said carrier signal has a bandwidth of 100 MHz.

20. The anticipatory object detection system of claim 18 in which said oscillator means includes a voltage controlled oscillator.

21. The anticipatory object detection system of claim 12 in which said detection device includes a plurality of channels, each said channel extracting one of a plurality of harmonic components from said modulation signal.

22. The anticipatory object detection system of claim 21 in which each of said plurality of channels includes a pulse shaping circuit.

23. The anticipatory object detection system of claim 22 in which each of said plurality of channels includes an amplifier circuit for varying the amplitude of the harmonic component thereby adjusting the relationship between the harmonic components relative to each other.

24. The anticipatory object detection system of claim 23 in which said pulse shaping circuit includes means for rectifying each said harmonic component.

25. The anticipatory object detection system of claim 24 in which said range determining device includes detector means for detecting the peak amplitude of each said harmonic component to produce a DC voltage signal for each said harmonic component.

26. The anticipatory object detection system of claim 25 in which said range determining device further includes analog to digital converter means for converting said DC voltage signal to a digital signal.

27. The anticipatory object detection system of claim 21 in which one of said channels extracts the Doppler of the DC component of said modulation signal.

28. The anticipatory object detection system of claim 21 in which one of said plurality of channels extracts the Doppler of the first harmonic component of said modulation signal.

29. The anticipatory object detection system of claim 21 in which one of said plurality of channels extracts the Doppler of the second harmonic component of said modulation signal.

* * * * *